United States Patent
Sugihara (10) Patent No.: US 9,280,149 B2
(45) Date of Patent: Mar. 8, 2016

(54) MOTOR CONTROL DEVICE AND MOTOR CONTROL METHOD

(71) Applicant: KABUSHIKI KAISHA YASKAWA DENKI, Kitakyushu-shi (JP)

(72) Inventor: Fuminori Sugihara, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 71 days.

(21) Appl. No.: 14/171,781

(22) Filed: Feb. 4, 2014

(65) Prior Publication Data
US 2014/0217951 A1 Aug. 7, 2014

(30) Foreign Application Priority Data
Feb. 6, 2013 (JP) ................................. 2013-021564

(51) Int. Cl.
G05B 19/29 (2006.01)
G05B 19/416 (2006.01)
G05B 19/19 (2006.01)
G05B 11/01 (2006.01)

(52) U.S. Cl.
CPC .............. *G05B 19/416* (2013.01); *G05B 19/19* (2013.01); *G05B 11/011* (2013.01); *G05B 2219/41426* (2013.01); *G05B 2219/43117* (2013.01)

(58) Field of Classification Search
CPC .................................................... G05B 11/011
USPC .................................. 318/600, 601, 430, 431
See application file for complete search history.

(56) References Cited

U.S. PATENT DOCUMENTS

| 2006/0071625 A1* | 4/2006 | Nakata et al. ............ 318/568.12 |
| 2012/0229069 A1 | 9/2012 | Ohta et al. |
| 2014/0300308 A1* | 10/2014 | Ikeda et al. .................... 318/561 |
| 2015/0015173 A1* | 1/2015 | Ide et al. ....................... 318/561 |

FOREIGN PATENT DOCUMENTS

| CN | 102684600 | 9/2012 |
| JP | 2012-191675 | 10/2012 |

OTHER PUBLICATIONS

Chinese Office Action for corresponding CN Application No. 201410016397.3, Jan. 4, 2016.

* cited by examiner

*Primary Examiner* — Erick Glass
(74) *Attorney, Agent, or Firm* — Mori & Ward, LLP (57) ABSTRACT

A motor control device includes a power converter, a velocity controller, and a certain-position stop controller. The power converter outputs a driving current on the basis of an input torque command. The velocity controller generates a calculated torque command on the basis of a difference between a velocity represented by a velocity command and a motor velocity. The certain-position stop controller performs position control by, after first detecting a reference position of a motor during velocity control, generating a position command for positioning the motor from the reference position to a target stop position at a torque of a torque schedule, generating the velocity command on the basis of a difference between a position represented by the position command and the motor position, and outputting a value resulting from adding a torque feedforward command generated on the basis of the torque schedule to the calculated torque command.

13 Claims, 7 Drawing Sheets

MOTOR CONTROL DEVICE AND MOTOR CONTROL METHOD

CROSS-REFERENCE TO RELATED APPLICATIONS

The present disclosure contains subject matter related to that disclosed in Japanese Priority Patent Application JP 2013-021564 filed in the Japan Patent Office on Feb. 6, 2013, the entire contents of which are hereby incorporated by reference.

BACKGROUND

1. Field of the Invention

The embodiments disclosed herein relate to a motor control device and a motor control method.

2. Description of the Related Art

Japanese Unexamined Patent Application Publication No. 2012-191675 discloses a configuration of switching between velocity control for a spindle during a normal operation and position control for certain-position stop control for the spindle during exchange of a tool, in a motor control device that controls driving of a spindle motor of a machine tool, for example. During velocity control, velocity feedback control is performed. During position control, torque feedforward control is performed as well as velocity feedback control and position feedback control.

Specifically, the moment of inertia of a rotor of the motor and a control target is identified during certain-position stop control, and an acceleration command (deceleration command) for causing abrupt stop at a maximum torque with respect to the moment of inertia is calculated. With the product of the acceleration command and the moment of inertia, a torque feedforward command is calculated, the torque feedforward command is added to a torque command in velocity feedback control, and a resulting command is input to the motor. A position command for position feedback control is calculated by performing second-order differentiation on the acceleration command. Accordingly, positioning control for a target stop position, at which a tool can be appropriately exchanged, can be performed in short time while abrupt stop at a maximum torque is performed during certain-position stop control.

SUMMARY

According to an aspect of the disclosure, there is provided a motor control device including a power converter, a velocity controller, and a certain-position stop controller. The power converter outputs a current for driving a motor on the basis of a first torque command. The velocity controller generates a second torque command on the basis of a difference between a velocity represented by a velocity command for the motor and a motor velocity of the motor. The certain-position stop controller performs position control of the motor by, after first detecting a reference position per rotation of a position detector that detects a motor position of the motor during velocity control of the motor, generating a position command for positioning the motor from the reference position detected first to a target stop position at a torque of a torque schedule that is changed in a certain process, generating the velocity command on the basis of a difference between a position represented by the position command and the motor position, and outputting, as the first torque command, a value resulting from adding a torque feedforward command generated on the basis of the torque schedule to the second torque command. The certain-position stop controller includes a torque feedforward command corrector configured to correct the torque feedforward command on the basis of the first torque command.

According to another aspect of the disclosure, there is provided a motor control method including: performing velocity control of a motor in response to input of a stop initiating command for stopping the motor, so that a motor velocity of the motor becomes a detectable velocity at which a reference position of a position detector that detects a position of the motor is detectable; and performing position control of the motor when the reference position is detected first after a difference between the detectable velocity and the motor velocity has become smaller than a predetermined value, so that the motor is stopped at a preset target stop position in a torque schedule that is changed in a certain process. In the performing position control, a torque command to be input to the motor is corrected so that a torque output by the motor is compliant with the torque schedule.

DESCRIPTION OF THE EMBODIMENTS

Hereinafter, an embodiment will be described with reference to the drawings.

Figure 1:
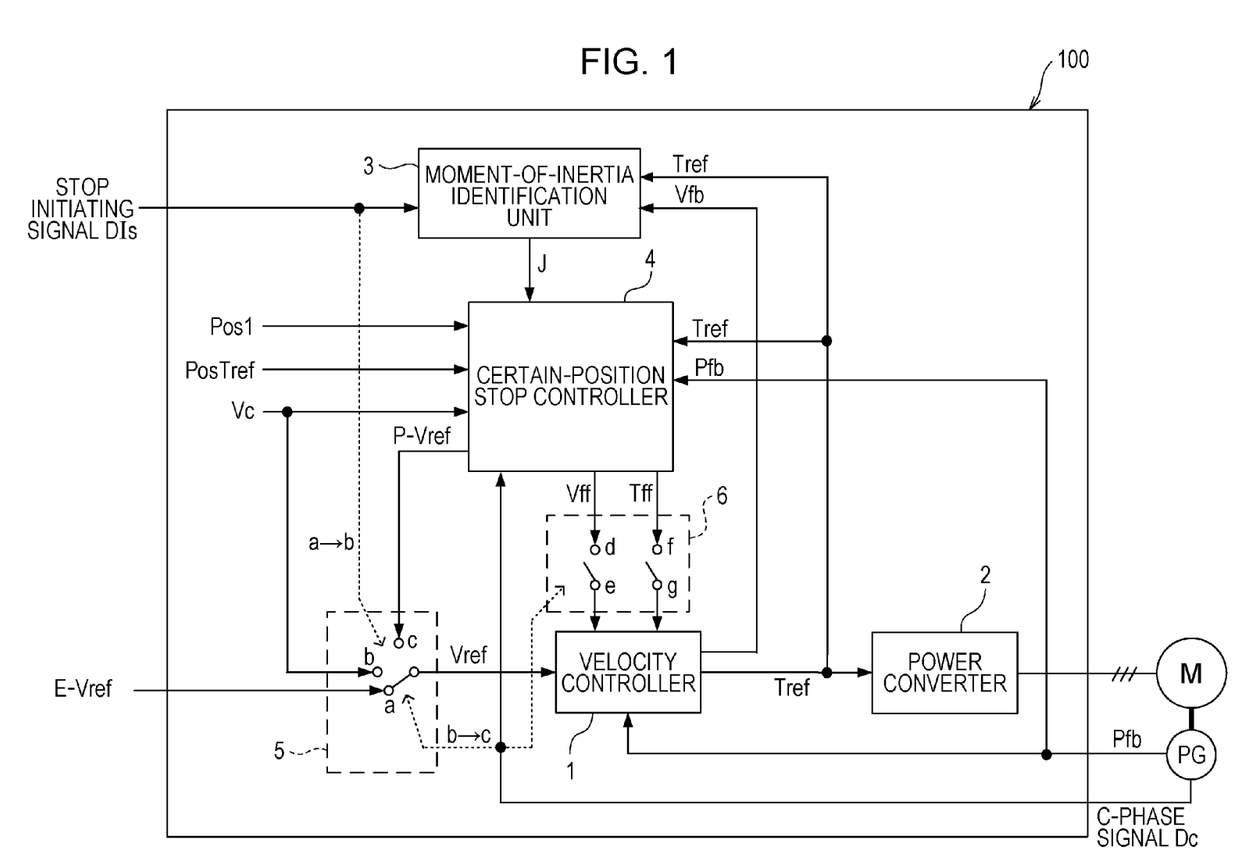
FIG. 1 is a diagram illustrating the system configuration of a motor control device according to an embodiment.

FIG. 1 illustrates a system configuration diagram of a motor control device according to an embodiment. Referring to FIG. 1, a motor control device 100 includes a velocity controller 1, a power converter 2, a moment-of-inertia identification unit 3, a certain-position stop controller 4, a velocity command switcher 5, and a command input switcher 6. The motor control device 100 controls driving of a motor M provided with a position detector PG.

The motor M is, for example, a rotary motor, and is used for driving a spindle of a machine tool capable of attaching, detaching, or exchanging a tool, such as a machining center. The position detector PG detects a position (rotation position) Pfb of the motor M, and a C-phase signal Dc that is obtained only when the motor M is positioned at a reference position per rotation of the position detector PG. A motor velocity Vfb is obtained by differentiating the motor position Pfb by using a differentiator provided in the velocity controller 1 (see FIG. 2 described below).

The velocity controller 1 outputs an input torque command Tref on the basis of a velocity command Vref (described below), a motor position Pfb detected by the position detector PG, and a velocity feedforward command Vff and a torque feedforward command Tff received from the certain-position stop controller 4 (described below).

The power converter 2 outputs a driving current that is based on pulse width modulation (PWM) control to the motor M, on the basis of the input toque command Tref received from the velocity controller 1.

The moment-of-inertia identification unit 3 identifies, on the basis of the input torque command Tref and the motor velocity Vfb, the moment of inertia J of the entire control target, which includes a rotor of the motor M, a spindle that operates in conjunction with the rotor (output axis), and a rotary tool attached to the spindle. In an example of this embodiment, identification of the moment of inertia J is started upon a stop initiating signal DIs being input from a higher-order control device (not illustrated).

The certain-position stop controller 4 generates a stop-time velocity command P-Vref, a velocity feedforward command Vff, and a torque feedforward command Tff on the basis of various parameters, and outputs the generated commands. The various parameters include a target stop position Pos1 (described below), a maximum counter torque PosTref, a C-phase detection velocity command Vc, the moment of inertia J identified by the moment-of-inertia identification unit 3, an input torque command Tref, and a motor position Pfb.

Among these parameters, the target stop position Pos1 is a rotation position of the motor M corresponding to a case where the spindle is positioned at a rotation position at which a tool is exchangeable in the machine tool. In this embodiment, positioning stop (so-called indexing) at the target stop position Pos1 is performed when the motor M is to be stopped. The maximum counter torque PosTref is a maximum torque that can be applied to the motor M in the direction opposite to the forward rotation direction, that is, a maximum counter torque (a negative value) that can be applied to slow down the rotation in the forward direction of the motor M. Regarding a typical rotary encoder constituting the position detector PG, a maximum velocity at which the C-phase signal Dc can be detected is lower than the rated maximum velocity of the motor M in many cases, and the C-phase detection velocity command Vc is set to the maximum velocity. For the target stop position Pos1, the maximum counter torque Pos-Tref, and the C-phase detection velocity command Vc, fixed values that are preset in accordance with the specifications of the machine tool, the motor M, and the position detector PG are given.

The velocity command switcher 5 performs switching to select, on the basis of the stop initiating signal DIs received from the higher-order control device and the C-phase signal Dc received from the position detector PG, any one of a normal-time velocity command E-Vref received from the higher-order control device, the C-phase detection velocity command Vc, and the stop-time velocity command P-Vref, the selected command being regarded as a velocity command Vref, and outputs the velocity command Vref to the velocity controller 1. While the motor M is being driven at a velocity hither than the velocity represented by the C-phase detection velocity command Vc, the velocity command switcher 5 establishes a connection to a terminal "a", and outputs a normal-time velocity command E-Vref serving as a velocity command Vref to the velocity controller 1. When the stop initiating signal DIs is input from the higher-order control device, the velocity command switcher 5 switches the connection from the terminal "a" to a terminal "b", and outputs the C-phase detection velocity command Vc serving as a velocity command Vref. After that, when the C-phase signal Dc is detected from the position detector PG, the velocity command switcher 5 switches the connection from the terminal "b" to a terminal "c", and outputs the stop-time velocity command P-Vref serving as a velocity command Vref. The normal-time velocity command E-Vref corresponds to a first velocity command according to an aspect of the disclosure, the C-phase detection velocity command Vc corresponds to a second velocity command according to an aspect of the disclosure, and the stop-time velocity command P-Vref corresponds to a third velocity command according to an aspect of the disclosure.

The command input switcher 6 switches between input and non-input of the velocity feedforward command Vff and the torque feedforward command Tff from the certain-position stop controller 4 to the velocity controller 1, on the basis of the C-phase signal Dc received from the position detector PG. While the motor M is being driven at a velocity higher than the velocity represented by the C-phase detection velocity command Vc, the velocity feedforward command Vff and the torque feedforward command Tff are not input to the velocity controller 1. While the C-phase signal Dc is being detected from the position detector PG, the velocity feedforward command Vff and the torque feedforward command Tff are input to the velocity controller 1.

Figure 2:
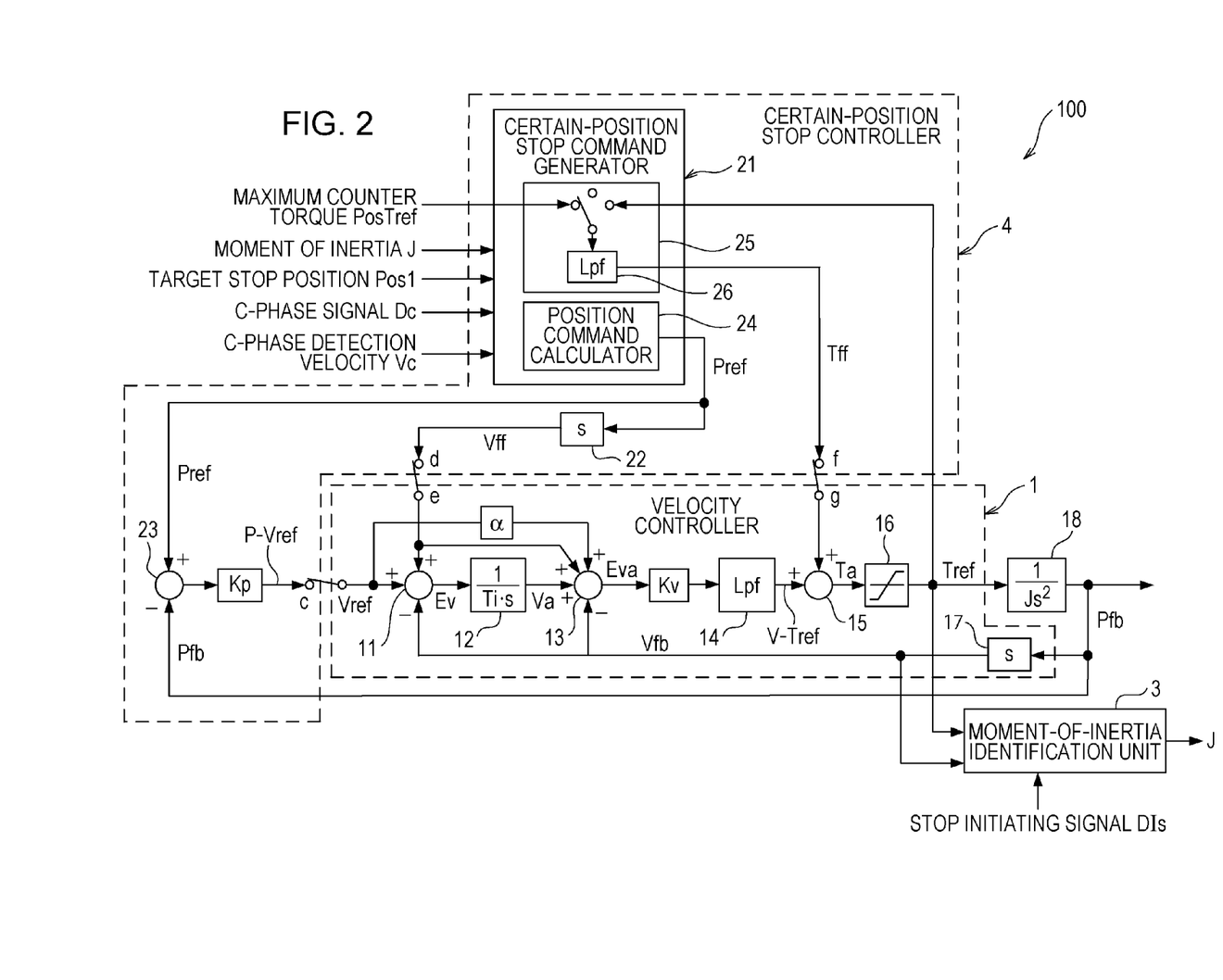
FIG. 2 is a diagram illustrating, in the form of a transfer function, an entire control system in a connection state after a C-phase signal has been detected in the motor control device.

FIG. 2 illustrates, in the form of a transfer function, the entire control system in a connection state after the C-phase signal Dc has been detected in the motor control device 100 having the above-described configuration according to this embodiment. The moment-of-inertia identification unit 3 is illustrated in a simplified manner, as in FIG. 1. From the viewpoint of the control system, the power converter 2 hardly has an influence on signal processing, and thus the illustration thereof is omitted.

Referring to FIG. 2, the velocity controller 1 includes a first adder-subtractor 11, an integrator 12, a feedforward gain α, a second adder-subtractor 13, a velocity loop gain Kv, a low-pass filter 14, a third adder-subtractor 15, a torque limiter 16, and a differentiator 17.

The first adder-subtractor 11 adds the velocity command Vref and velocity feedforward command Vff received from the certain-position stop controller 4, and subtracts therefrom a motor velocity Vfb, which is obtained by differentiating a motor position Pfb by using the differentiator 17, so as to obtain the difference Ev thereof.

The integrator 12 integrates the difference Ev by using an integration time constant Ti, so as to obtain a velocity Va.

The second adder-subtractor 13 adds the velocity Va, the velocity feedforward command Vff, and a value obtained by multiplying the velocity command Vref by a feedforward gain α, and subtracts therefrom the motor velocity Vfb, so as to obtain the difference Eva thereof.

The velocity controller 1 multiplies the difference Eva by the velocity loop gain Kv, and removes a high-frequency component by using the low-pass filter 14, so as to generate a calculated torque command V-Tref. The low-pass filter 14 functions as a torque command filter that suppresses vibration caused by a sampling frequency of a torque command.

The third adder-subtractor 15 adds the calculated torque command V-Tref and the torque feedforward command Tff received from the certain-position stop controller 4, so as to obtain an add torque command Ta.

The torque limiter 16 controls the upper-limit value and the lower-limit value of the add torque command Ta and outputs an input torque command Tref. The lower-limit value of the input torque command Tref is controlled by the above-described maximum counter torque PosTref. The input torque command Tref corresponds to a first torque command according to an aspect of the disclosure, and the calculated torque command V-Tref corresponds to a second torque command according to an aspect of the disclosure.

A control target 18, which includes the motor M, is driven to be rotated on the basis of the input torque command Tref output from the velocity controller 1. The control target 18 is equivalent to $1/Js^2$, which is expressed by using the total moment of inertia J of the rotor of the motor M, the spindle that operates in conjunction with the rotor (output axis), and a rotary tool attached to the spindle. In an example of this embodiment, the rotation velocity ratio of the rotor of the motor M to the spindle (rotary tool) is 1:1.

In addition, referring to FIG. 2, the certain-position stop controller 4 includes a certain-position stop command generator 21, a differentiator 22, a fourth adder-subtractor 23, and a position loop gain Kp.

The certain-position stop command generator 21 includes a position command calculator 24 and a torque feedforward command switcher 25. In an example of this embodiment, these devices are constituted by software that is implemented by a central processing unit (CPU) that is not illustrated (see the flowchart in FIG. 7 described below). Upon detection of the C-phase signal Dc, the position command calculator 24 synchronizes with system clock signals in certain periods, and generates and outputs a position command Pref, which represents a desired rotation position of the motor M, every time a system clock signal is output. The torque feedforward command switcher 25 switches, at switching timing of a torque schedule (described below), the torque feedforward command Tff to any one of non-output (0 torque), a maximum counter torque PosTref, and an input torque command Tref received from the velocity controller 1, and outputs the torque feedforward command Tff (see FIG. 5 described below). At this time, the torque feedforward command switcher 25 outputs the torque feedforward command Tff after removing noise generated through switching by using the low-pass filter 26.

The certain-position stop controller 4 subtracts, using the fourth adder-subtractor 23, the motor position Pfb output from the position detector PG from the position command Pref output from the position command calculator 24, and multiplies the resulting difference by the position loop gain Kp, so as to output a stop-time velocity command P-Vref. In the connection state illustrated in FIG. 2, the velocity controller 1 receives the stop-time velocity command P-Vref as a velocity command Vref. The certain-position stop controller 4 differentiates the position command Pref output from the position command calculator 24 by using the differentiator 22, and outputs a velocity feedforward command Vff.

In the above-described configuration of the control system, feedforward control using the velocity feedforward command Vff and torque feedforward command Tff is compositely performed together with P-IP feedback control that is based on a P feedback loop of a position control system that follows input of the position command Pref (hereinafter referred to as a position control system loop) and an IP feedback loop of a velocity control system (hereinafter referred to as a velocity control system loop). Although not illustrated, the power converter 2 includes a feedback loop of a current control system.

Figure 3:
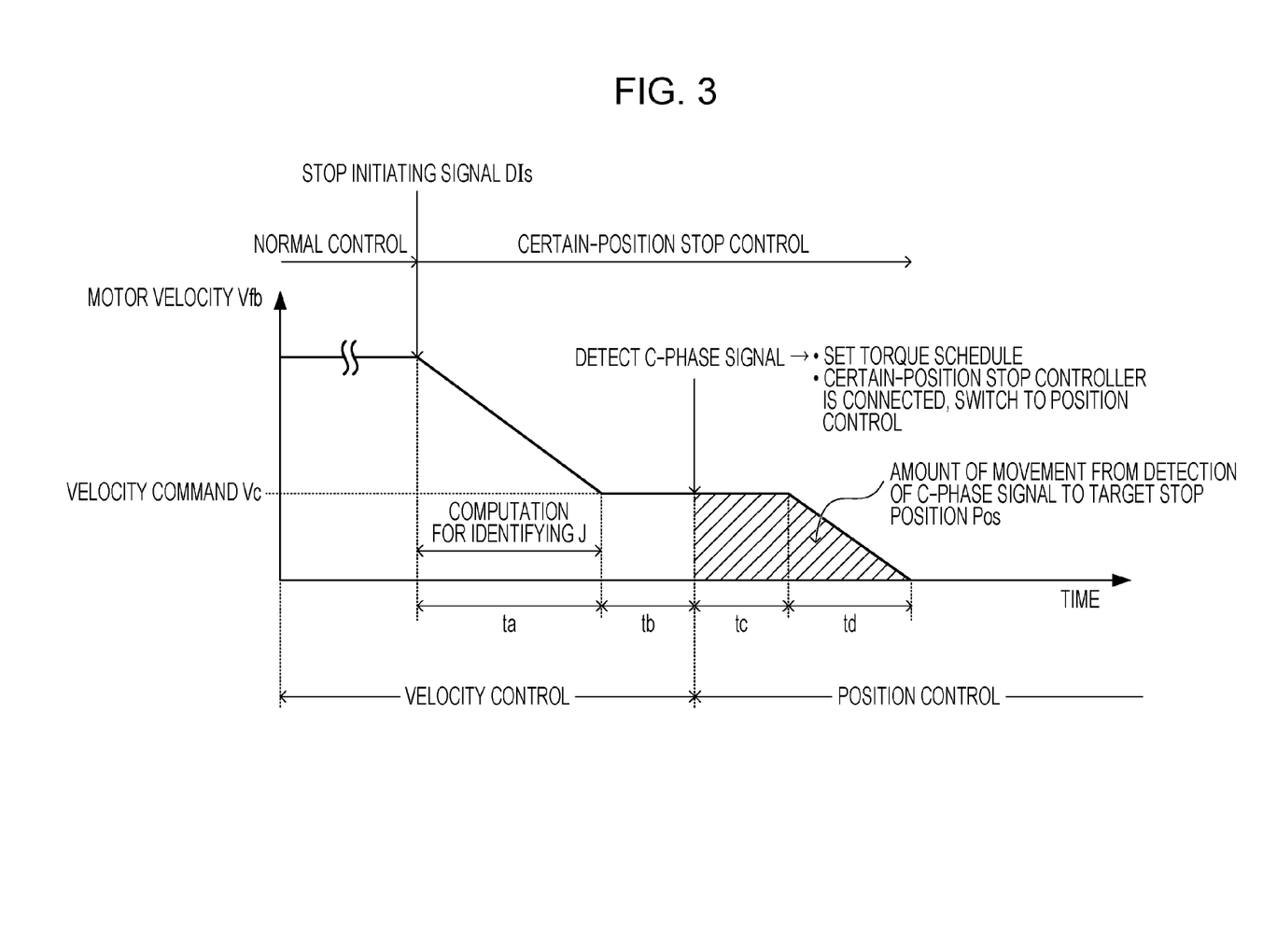
FIG. 3 is a time chart illustrating changes over time of a motor velocity during a period from when a motor starts to slow down in response to a stop initiating signal until when the motor stops at a target stop position.

FIG. 3 illustrates a sequence of certain-position stop control performed by the motor control device 100 having the above-described configuration according to this embodiment. FIG. 3 illustrates a time chart representing changes over time of the motor velocity Vfb during a period from when the motor M starts to slow down in response to a stop initiating signal DIs received from the higher-order control device (not illustrated) until when the motor M stops at the target stop position Pos1.

In this time chart, the state in an initial period is a normal operation state in which the velocity of the motor M is controlled in accordance with the normal-time velocity command E-Vref supplied from the higher-order control device (not illustrated). When the stop initiating signal DIs is input from the same higher-order control device, the sequence of certain-position stop control performed by the certain-position stop controller 4 is started. The sequence of certain-position stop control is performed through four sequential periods: a first period ta, a second period tb, a third period Tc, and a fourth period td.

In the first period ta, upon the stop initiating signal DIs being input, the velocity command Vref is switched from the normal-time velocity command E-Vref to the C-phase detection velocity command Vc, and thereby velocity control performed by the velocity controller 1 reduces the motor velocity Vfb to the upper-limit velocity Vc at which the C-phase signal Dc is detectable. While the velocity is decreasing in the first period ta, the moment-of-inertia identification unit 3 identifies the moment of inertia J of the entire control target 18. In an example of this embodiment, as described above, identification of the moment of inertia J is started just after input of the stop initiating signal DIs, and the identification process is completed within the first period ta.

Until the motor velocity Vfb is reduced to the C-phase detection velocity Vc and the C-phase signal Dc is detected first, the motor velocity Vfb is kept at the C-phase detection velocity Vc in the second period tb. During the first period ta and the second period tb, the velocity of the motor M is controlled in accordance with the velocity command Vref, only by velocity feedback control based on the velocity control system loop of the velocity controller 1 (precisely, current feedback control in the power converter 2 is also performed).

Upon the C-phase signal Dc being detected first, the third period tc is started. After the third period tc has been started, the certain-position stop controller 4 is connected to the velocity controller 1 as described above, and the control of the motor M is switched from velocity control to position control. At this time, all of the above-described velocity control system loop and position control system loop (and current control system loop) function, and position feedback control is performed. Also, feedforward control is performed in response to input of the velocity feedforward command Vff and torque feedforward command Tff. During the third period tc until the fourth period td is started in accordance with a torque schedule (described below), the motor velocity Vfb is kept at the C-phase detection velocity Vc, and the torque feedforward command Tff is not output (0 torque).

After the fourth period td has been started, abrupt slow-down and abrupt stop of the motor M is performed by using, basically, the maximum counter torque PosTref. When the motor M is completely stopped, the motor position Pfb of the motor M is the target stop position Pos1. That is, during the period from the start of the third period tc, at which the C-phase signal is detected, to the end of the fourth period td, at which the motor M stops, the area formed between the curve of the motor velocity Vfb and the time axis (the shaded area in FIG. 3) corresponds to the amount of relative movement from the C-phase position, which is the reference position of the motor M, to the target stop position Pos1.

As a result of performing the above-described sequence of certain-position stop control, the motor M can be stopped at the target stop position Pos1 in the shortest time after the stop initiating signal DIs has been input in the normal operation state in which operation is performed at an arbitrary motor velocity Vref. The third period tc corresponds to a first period according to an aspect of the disclosure, and the fourth period td corresponds to a second period according to an aspect of the disclosure. The timing at which the third period tc is started (the timing at which the C-phase signal Dc is detected) corresponds to a first timing according to an aspect of the disclosure, the timing at which the third period tc ends (the timing at which the fourth period td is started) corresponds to a second timing according to an aspect of the disclosure, and the timing at which the fourth period td ends corresponds to a third timing according to an aspect of the disclosure. The first period ta and the second period tb correspond to performing velocity control according to an aspect of the disclosure, and the third period tc and the fourth period td correspond to performing position control according to an aspect of the disclosure.

Figure 4:
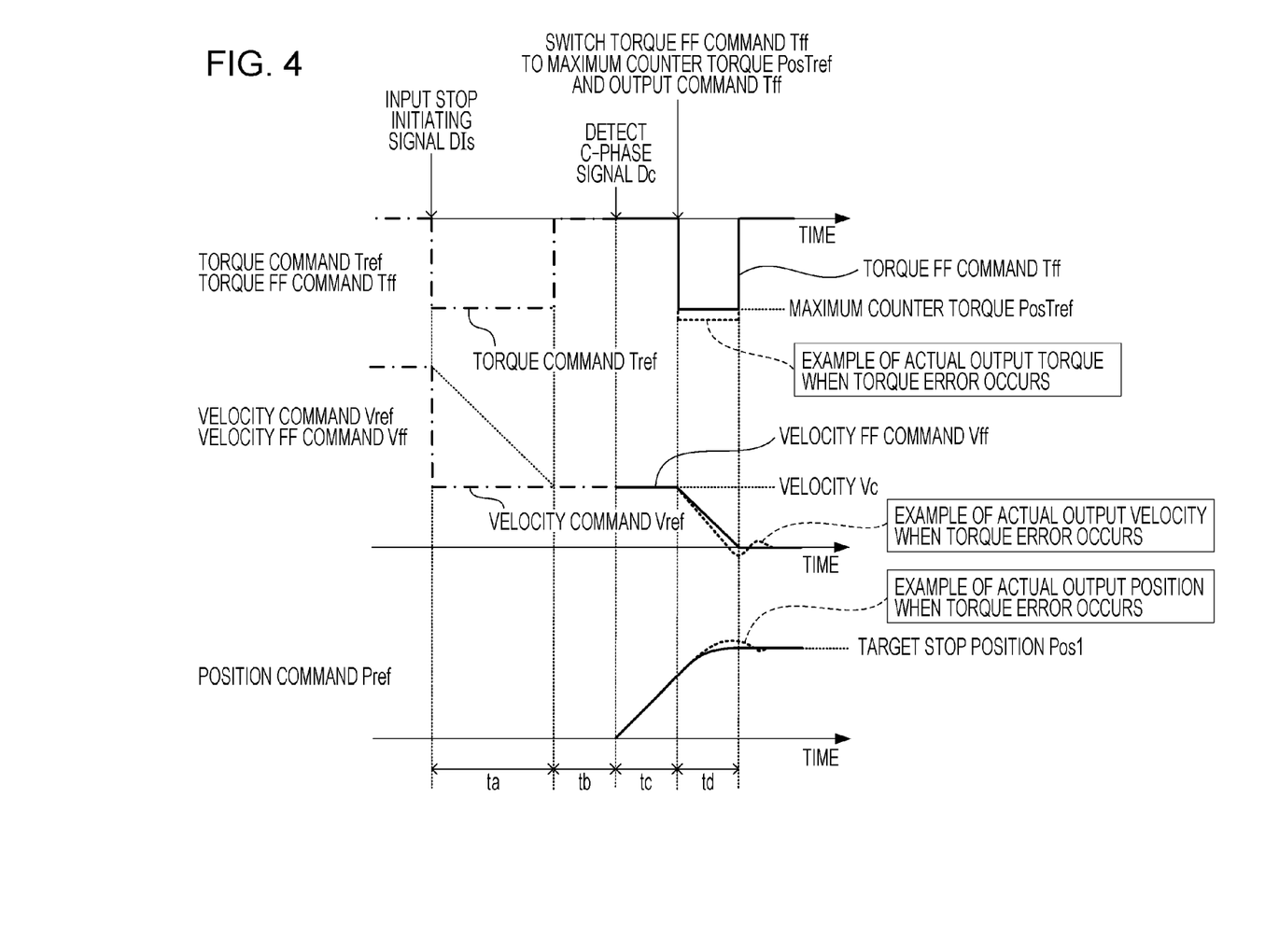
FIG. 4 is a diagram illustrating a state in which an input torque command, torque feedforward command, velocity command, velocity feedforward command, and position command change in a sequence of certain-position stop control.

FIG. 4 illustrates a state in which the input torque command Tref, torque feedforward command Tff, velocity command Vref, velocity feedforward command Vff, and position command Pref change in the sequence of certain-position stop control. Referring to FIG. 4, during the first period ta and the second period tb in which velocity control is performed, the position command Pref is not input, the input torque command Tref is generated in accordance with the velocity command Vref (C-phase detection velocity Vc) input to the velocity controller 1, and the velocity of the motor M is controlled in accordance with the input torque command Tref (see a chained line in FIG. 4). During the third period tc and the fourth period td after the C-phase signal Dc has been detected, the position command Pref, velocity feedforward command Vff, and torque feedforward command Tff based on a torque schedule (described below) are input, the input torque command Tref is generated in accordance with these commands, and the position of the motor M is controlled (see a solid line in FIG. 4).

During the first period ta, the C-phase detection velocity command Vc is input as the velocity command Vref, and the input torque command Tref is generated using a counter torque of a negative value through velocity feedback control, so as to reduce the velocity from the normal operation velocity to the C-phase detection velocity Vc. Here, in a case where the motor velocity Vfb before the first period ta is considerably higher than the C-phase detection velocity Vc, the input torque command Tref is controlled to be the maximum counter torque PosTref by the torque limiter 16. During the second period tb, the input torque command Tref is generated to have a positive value which is small enough to compensate for friction loss in the motor M, so that the motor velocity Vfb can be kept at the C-phase detection velocity Vc. This value is sufficiently small, and is thus regarded as 0 torque in the description and drawings of this embodiment.

During the third period tc and the fourth period td, the position command Pref and the velocity feedforward command Vff are generated on the basis of a torque schedule that is set every time the certain-position stop control is performed.

Now, a torque schedule is described. As described above, the third period tc is started when the C-phase signal Dc is detected first, and the fourth period td is ended when the motor M is stopped at the target stop position Pos1. During the third period tc, the torque feedforward command Tff is set to 0 torque, and the motor velocity Vfb is kept at the C-phase detection velocity Vc. During the fourth period td, the torque feedforward command Tff is switched to the maximum counter torque PosTref, and the motor M is abruptly stopped in the shortest time.

However, the moment of inertia J of the control target 18 varies every time the rotary tool attached to the spindle is exchanged. Accordingly, the time period that is necessary for causing abrupt slowdown and abrupt stop from the C-phase detection velocity Vc by using the same maximum counter torque PosTref, that is, the time length of the fourth period td, varies. Thus, it is necessary to identify the moment of inertia J every time certain-position stop control is performed, and calculate, on the basis of the moment of inertia J, the time length of the fourth period td in which the maximum counter torque PosTref is output. Since the amount of movement (amount of rotation) of the motor M from the reference position at the time when the C-phase signal Dc is detected to the target stop position Pos1 does not change, the time length of the third period tc can be calculated on the basis of the calculated time length of the fourth period td. In this way, during the third period tc in which the torque feedforward command Tff is 0 torque, and during the fourth period td in which the torque feedforward command Tff is the maximum counter torque PosTref, a torque schedule used for executing the certain-position stop control is set.

Specifically, the time length of the fourth period td can be calculated by using the following equation.

$$td = J \cdot Vc/PosTref \qquad (1)$$

Note that J represents the moment of inertia (identified value), Vc represents the C-phase detection velocity (fixed value), and PosTref represents the maximum counter torque (fixed value). Further, the time length of the third period tc can be calculated by using the following equation, with reference to the above equation (1).

$$\begin{aligned} tc &= Pos1/Vc - td/2 \qquad (2)\\ &= Pos1/Vc - J \cdot Vc/2 \cdot PosTref \end{aligned}$$

Note that Pos1 represents the target stop position (fixed value). In a case where the calculated value of tc is a negative value, $2n\Pi$ (n is the smallest integer capable of causing tc to have a positive value) may be added.

During the third period tc whose time length has been set in the above-described manner, the position command Pref is generated and output so that the motor M moves at an equal velocity of the C-phase detection velocity Vc. More specifically, estimated values of the motor position, which are increased by the value corresponding to the same distance every time the above-described system clock signal is output, are sequentially generated and output as the position commands Pref. Further, during the third period tc, the velocity feedforward command Vff is output while being kept at the C-phase detection velocity Vc (Vff is a first-order differentiation value of Pref, and thus the velocity is equal).

During the fourth period td, the position command Pref is output so that the control target 18 of the moment of inertia J that is rotated at the C-phase detection velocity Vc can be just stopped at the end of the fourth period td by the maximum counter torque PosTref. Also, during the fourth period td, the velocity feedforward command Vff is generated and output so that the control target 18 can be completely stopped from the C-phase detection velocity Vc, at a constant acceleration (deceleration) of the motor velocity, within the fourth period td.

As described above, during the third period tc and the fourth period td over which position control is performed, the position command Pref and the velocity feedforward command Vff are generated and output so as to comply with a preset torque schedule. In this embodiment, the torque feedforward command Tff is output on the basis of the torque schedule, whereas the position command Pref and the velocity feedforward command Vff compliant with the same torque schedule are output. Accordingly, position control is performed so that positioning stop at the target stop position Pos1 can be performed as scheduled by using all of velocity feedback control, position feedback control, velocity feedforward control, and torque feedforward control that are balanced with one another.

However, in the actual motor M, a torque error may occur between a torque represented by an input torque command and an actually output torque. The cause of such a torque error may be an error or variation in torque characteristics caused by a manufacture error or aged deterioration of the motor M, or a difference in torque characteristics between acceleration time and deceleration time in a case where an induction motor is used as the motor M.

For example, even if a current corresponding to the input torque command Tref (=maximum counter torque PosTref) used for control is supplied to the motor M, the motor M may actually output a torque that is lower than the torque represented by the torque command, due to the above-described torque error (see the broken-line portion of the torque in FIG. 4). In this case, the motor velocity Vfb becomes 0 before the motor position Pfb reaches the target stop position Pos1 before the fourth period td ends. However, the torque feedforward command Tff based on the torque schedule further continues to output the maximum counter torque PosTref, and thus the motor velocity Vfb overshoots. Further, in accordance with this, the motor position Pfb overshoots the target stop position Pos1 due to position feedback control and velocity feedback control. After that, however, in the torque schedule, the torque feedforward command Tff is switched to 0 torque, and the motor velocity Vfb converges to 0 and the motor position Pfb converges to the target stop position Pos1 due to position feedback control and velocity feedback control. That is, in a case where the motor M has a torque error, overshoot occurs in the motor velocity Vfb and the motor position Pfb (see the broken-line portion of the velocity and position in FIG. 4).

Such a phenomenon results from an error that occurs in identification of the moment of inertia J. In some cases, such a phenomenon occurs due to excess or deficiency of the time length of the fourth period td, which is a slowdown period, caused by a calculation error. For example, in a case where an induction motor is used as the motor M and where computation of identifying the moment of inertia J is performed during acceleration of the motor M, an incorrect time length of the fourth period td is calculated using the moment of inertia J containing an error, due to a difference in torque characteristics between acceleration time and deceleration time, as described above. In this way, even if excess or deficiency exists in the slowdown period defined by the fourth period td, the above-described overshoot phenomenon occurs.

Figure 5:
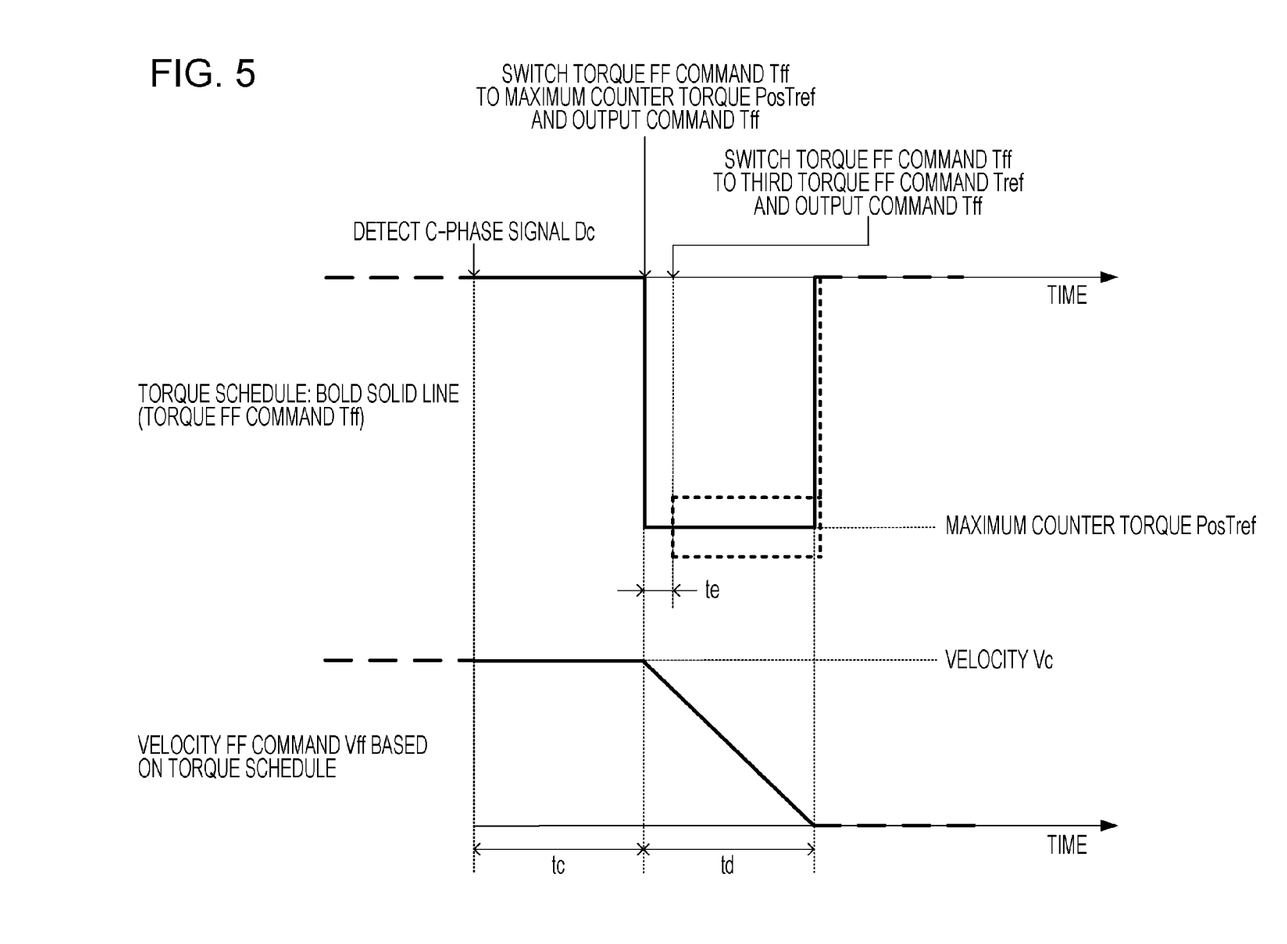
FIG. 5 is a diagram illustrating a state of change in a case where a torque feedforward command is corrected.

In this embodiment, to suppress the occurrence of the above-described overshoot, the torque feedforward command Tff is corrected during the fourth period td. Specifically, as illustrated in FIG. 5, after a certain period te has elapsed from the start of the fourth period td, the torque feedforward command Tff is switched from the maximum counter torque PosTref to the input torque command Tref, and the torque feedforward command Tff is output. In FIG. 5, a torque schedule is represented by a bold solid line on the upper side, and the velocity feedforward command Vff based on the torque schedule is represented by a bold solid line on the lower side. The torque feedforward command Tff outputs 0 torque (non-output) in the third period tc in accordance with the torque schedule. At the start of the fourth period td, the torque feedforward command Tff is initially switched to the maximum counter torque PosTref, and the torque feedforward command Tff is output.

However, after the certain period te has elapsed from the start of the fourth period td, switching is performed so that the input torque command Tref output from the torque limiter 16 is output as the torque feedforward command Tff (see a broken-line portion in FIG. 5). On the other hand, the velocity feedforward command Vff causes slowdown change at the slowdown rate compliant with the torque schedule as previously, regardless of the output switching of the torque feedforward command Tff. Although not illustrated, the position command Pref is also changed in accordance with the torque schedule. As a result of outputting the torque feedforward command Tff, the velocity feedforward command Vff, and the position command Pref in the above-described manner, the torque feedforward command Tff can be corrected so that the motor M can actually output a torque in accordance with the torque schedule even if a torque error occurs in the motor M. The details of the correction will be described below.

Figure 6:
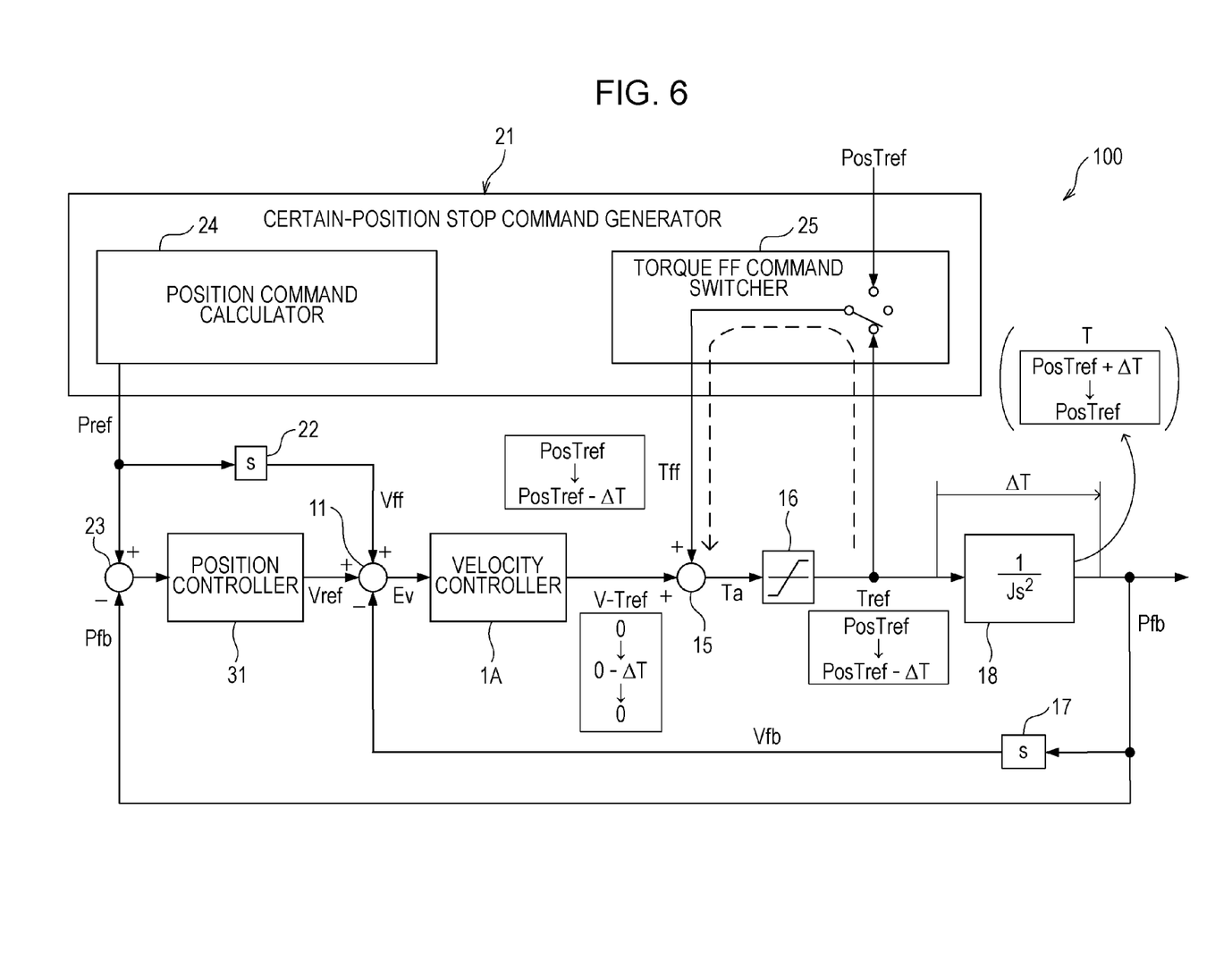
FIG. 6 is a diagram illustrating a state where an input torque command is output as a torque feedforward command.

FIG. 6 is a simplified diagram illustrating the control system illustrated in FIG. 2 in a switching state after the certain period to has elapsed from the start of the fourth period td, that is, in a state where the input torque command Tref is being output as the torque feedforward command Tff. A position controller 31 illustrated in FIG. 6 corresponds to the position loop gain Kp illustrated in FIG. 2. A velocity controller 1A illustrated in FIG. 6 corresponds to the integrator 12, the velocity loop gain Kv, and the low-pass filter 14 illustrated in FIG. 2. To simplify the description, illustration of the feedforward gain α and the second adder-subtractor 13 is omitted. Hereinafter, a "torque T" refers to a torque that is directly output by the motor M.

Referring to FIG. 6, the loop for feeding back the motor velocity Vfb to the first adder-subtractor 11 via the first adder-subtractor 11, the velocity controller 1A, the third adder-subtractor 15, the torque limiter 16, the control target 18 (including the motor M), and the differentiator 17 forms a velocity control system loop. The loop for feeding back the motor position Pfb to the fourth adder-subtractor 23 via fourth adder-subtractor 23, the position controller 31, the first adder-subtractor 11, the velocity controller 1A, the third adder-subtractor 15, the torque limiter 16, and the control target 18 forms a position control system loop. Accordingly, in the configuration of the control system illustrated in FIG. 6, velocity feedback control based on the velocity control system loop, position feedback control that follows the position command Pref based on the position control system loop, velocity feedforward control based on the velocity feedforward command Vff, and torque feedforward control based on the torque feedforward command Tff are performed in a composite manner.

Regarding the behavior of velocity feedback control, control is performed so that the calculated torque command V-Tref output from the velocity controller 1A becomes 0 in response to input of the velocity feedforward command Vff. Regarding the behavior of position feedback control, control is performed so that the velocity command Vref output from the position controller 31 becomes 0 in response to input of the position command Pref. As described above, each of the velocity feedforward command Vff and the position command Pref is generated and output in accordance with the torque schedule.

For example, in a case where the control target 18 does not have a torque error ΔT (ΔT=0), the torque feedforward command Tff is output after being switched to the maximum counter torque PosTref in accordance with the torque schedule before the certain period te has elapsed, and thereby torque feedforward control is balanced with the other position/velocity feedback control and velocity feedforward control. Thus, the calculated torque command V-Tref output by the velocity controller 1A becomes 0. In this balanced state, the control target 18 is controlled mainly by the torque feedforward command Tff. In this case, after the torque feedforward command Tff is switched from the maximum counter torque PosTref to the input torque command Tref after the certain period te has elapsed, the maximum counter torque PosTref circulates and serves as the input torque command Tref, and the balanced state continues. Accordingly, ideal certain-position stop control can be performed.

However, in a case where the control target 18 has a torque error ΔT (ΔT≠0), the influence thereof is reflected in position/velocity feedback control. For example, in response to the input torque command Tref that has been input, if the control target 18 actually outputs a torque T that is higher than the torque represented by the input torque command Tref by the torque error ΔT (>0), the calculated torque command V-Tref is output as 0−ΔT so that position/velocity feedback control is performed in accordance with the torque schedule. At this time, the input torque command Tref (=maximum counter torque PosTref−ΔT), which is obtained by adding the existing torque feedforward command Tff (=maximum counter torque PosTref) to the calculated torque command V-Tref generated as 0−ΔT which is slightly smaller than 0, is generated and circulated as the next torque feedforward command Tff, and accordingly the control target 18 actually outputs a torque T that is slightly lower than the previous torque.

Position/velocity feedback control realizes position control compliant with the torque schedule, and thus the input torque command Tref is adjusted so that the control target 18 actually outputs the same torque as the torque represented by the torque schedule. At this time, the torque represented by the torque feedforward command Tff is kept to be slightly lower than the torque represented by the torque schedule (=maximum counter torque PosTref−ΔT). However, the balance with position/velocity feedback control is achieved, and thus the calculated torque command V-Tref returns to 0. That is, the state returns to an ideal control state centered on torque feedforward control. The above-described auto adjustment function is also implemented in a case where the control target 18 actually outputs a torque T that is lower than the torque represented by the input torque command Tref by a torque error ΔT.

The above-described auto adjustment function can be implemented by, with the torque feedforward command switcher 25 of the certain-position stop controller 4, switching a state from a state where the maximum counter torque PosTref based on the torque schedule is generated as the torque feedforward command Tff to a state where the existing input torque command Tref is generated as a new torque feedforward command Tff. To perform such circulatory generation, it is necessary to initially output a model maximum counter torque PosTref as the torque feedforward command Tff at the start of the fourth period td, and perform switching so as to output the input torque command Tref as the torque feedforward command Tff at the timing when the certain period Te has elapsed. After the switching, the torque feedforward command Tff is appropriately corrected by reflecting variations of the calculated torque command V-Tref caused by position/velocity feedback control, and accordingly the control target 18 actually outputs the torque T based on the torque schedule.

In the above-described manner, in the switching state illustrated in FIG. 6, the torque feedforward command Tff can be corrected so that the motor M can actually output the torque T based on the torque schedule even if a torque error ΔT occurs in the motor M. The response speed of the position/velocity feedback control is low, and thus it takes some time until the influence of the torque error ΔT of the control target 18 is reflected in the calculated torque command V-Tref. The above-described certain period te may be set so as to buy the time from when the input torque command Tref is changed to when the response of position/velocity feedback control is established. Specifically, in an example of this embodiment, the time corresponding to three clock signals of the above-described system clock is set. The time when the certain period te has elapsed corresponds to a certain timing according to an aspect of the disclosure.

When switching from velocity control to position control is performed after detecting the C-phase signal Dc (at the start of the third period tc), the influence of an integral element generated by velocity control can be eliminated and position control performed thereafter can be functionally switched, by clearing the value of the integrator 12 of the velocity controller 1 illustrated in FIG. 2. While the value of the input torque command Tref is limited by the torque limiter 16, the followingness after release of control can be enhanced by stopping an integration operation performed by the integrator 12.

Figure 7:
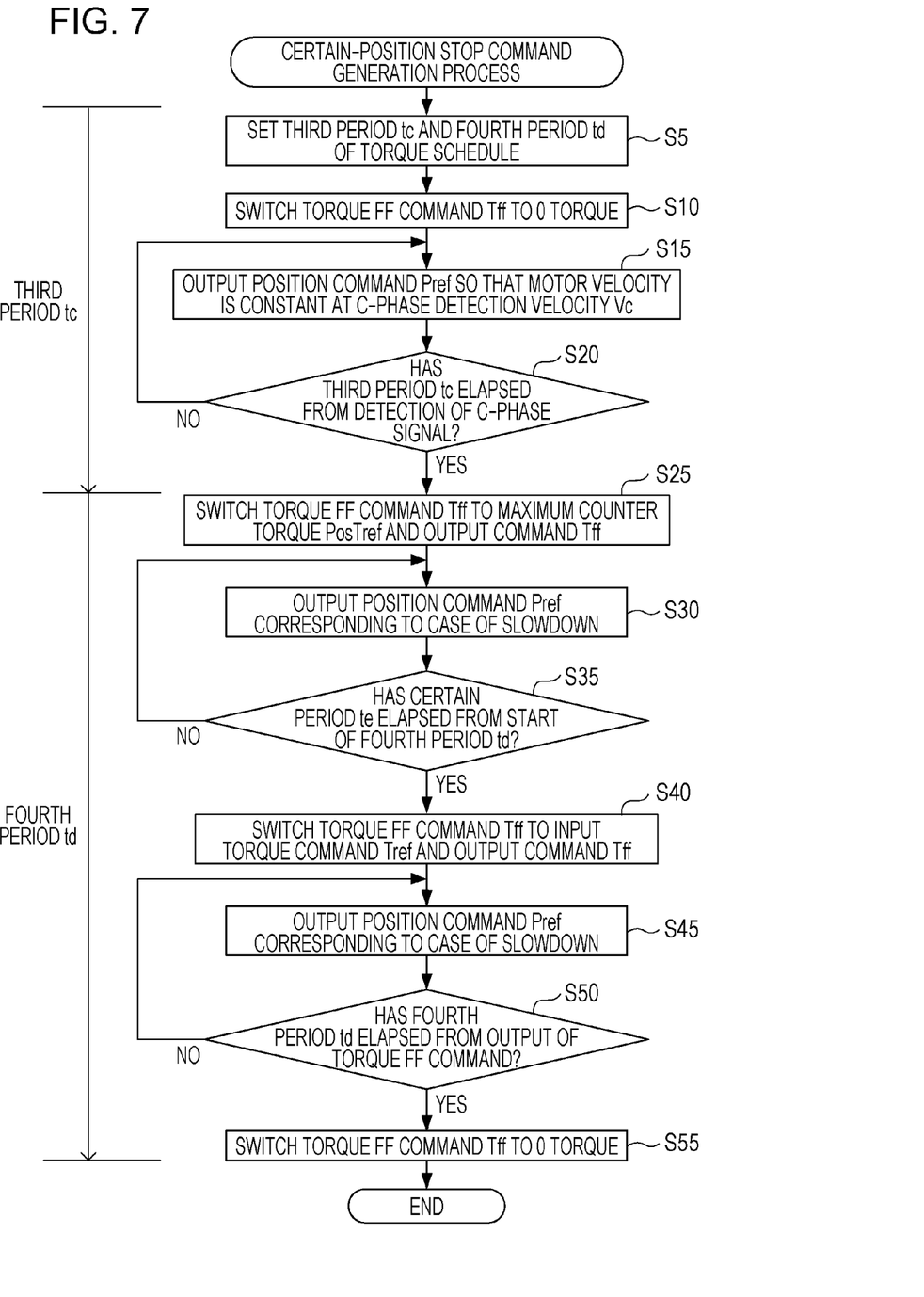
FIG. 7 is an example of a flowchart illustrating the control executed by a CPU of the motor control device to implement a certain-position stop command generation process.

With reference to FIG. 7, a description will be given of the details of a certain-position stop command generation process, which is performed as a function of the certain-position stop command generator 21 by a central processing unit (CPU, not illustrated) included in the motor control device 100, in order to realize the above-described function.

Referring to FIG. 7, the process illustrated in the flowchart is called and executed when the C-phase signal Dc is detected, that is, at the start of the third period tc. It is assumed that, at this time, the moment of inertia J of the control target 18 has already been identified, and the value of the integrator 12 of the velocity controller 1 has already been cleared.

First, in step S5, the time lengths of the third period tc and the fourth period td are calculated using equations (1) and (2) given above. Accordingly, a torque schedule is set in which the torque feedforward command Tff is set to 0 torque in the third period tc and the torque feedforward command Tff is set to the maximum counter torque PosTref in the fourth period td.

Subsequently, the process proceeds to step S10, in which the torque feedforward command Tff is switched to 0 torque.

Subsequently, the process proceeds to step S15, in which the position command Pref is continuously output so that the motor velocity is kept constant at the C-phase detection velocity Vc. The velocity feedforward command Vff obtained by performing first-order differentiation on the position command Pref is 0.

Subsequently, the process proceeds to step S20, in which it is determined whether or not the time length of the third period tc has elapsed from detection of the C-phase signal Dc. In other words, it is determined whether or not the end timing of the third period tc has come. If the time length of the third period tc has not elapsed, the determination is not satisfied, the process returns to step S15, and the same procedure is repeated.

On the other hand, after the time length of the third period tc has elapsed from detection of the C-phase signal Dc, the determination is satisfied and the process proceeds to step S25. At this time, the fourth period td is started.

In step S25, the torque feedforward command Tff is switched to the maximum counter torque PosTref, and the torque feedforward command Tff is continuously output.

Subsequently, the process proceeds to step S30, in which the position command Pref corresponding to a case where the velocity of the control target 18 of the moment of inertia J is reduced by the maximum counter torque PosTref based on the torque schedule is continuously output. The velocity feedforward command Vff resulting from first-order differentiation performed on the position command Pref continues to reduce the velocity at a certain reduction rate.

Subsequently, the process proceeds to step S35, in which it is determined whether or not the above-described certain period te has elapsed from the start of the fourth period td. In other words, it is determined whether or not position/velocity feedback control has been established and a new calculated torque command V-Tref has been generated after the torque feedforward command Tff of the maximum counter torque PosTref is output in step S25. If the certain period te has not elapsed, the determination is not satisfied, the process returns to step S30, and the same procedure is repeated.

On the other hand, if the certain period to has elapsed from the start of the fourth period td, the determination is satisfied, and the process returns to step S40.

In step S40, the torque feedforward command Tff is switched to the input torque command Tref, and the torque feedforward command Tff is continuously output.

Subsequently, the process proceeds to step S45, in which the position command Pref compliant with the torque schedule is continuously output, as in step S30. Also, the velocity feedforward command Vff resulting from first-order differentiation performed on the position command Pref continues to reduce the velocity at a certain reduction rate.

Subsequently, the process proceeds to step S50, in which it is determined whether or not the time length of the fourth period td has elapsed from output of the torque feedforward command Tff switched from 0 torque to the maximum counter torque PosTref. In other words, it is determined whether or not the end timing of the fourth period td has come. If the time length of the fourth period td has not elapsed, the determination is not satisfied, the process returns to step S45, and the same procedure is repeated.

On the other hand, if the time length of the fourth period td has elapsed, the determination is satisfied, and the process proceeds to step S55.

In step S55, the torque feedforward command Tff is switched to 0 torque. At this time, the torque based on the torque schedule is 0 torque, and thus the torques represented by the corresponding position command Pref and velocity feedforward command Vff are also 0. Then, this flow ends.

The above-described procedure of steps S35 and S40 functions as a torque feedforward command corrector according to an aspect of the disclosure.

As described above, in the motor control device 100 according to this embodiment, the torque feedforward command Tff to be added to the calculated torque command V-Tref is corrected on the basis of the input torque command Tref resulting from adding the torque feedforward command Tff to the calculated torque command V-Tref, in the procedure of steps S35 and S40 performed by the certain-position stop controller 4. While the certain-position stop controller 4 is operating, position feedback control and velocity feedback control are being performed in accordance with the torque schedule, and thus the torque error ΔT in the motor M is reflected in the calculated torque command V-Tref that is generated. Thus, as a result of correcting the torque feedforward command Tff to be added to the calculated torque command V-Tref on the basis of the input torque command Tref resulting from adding the torque feedforward command Tff to the calculated torque command V-Tref, in the procedure of steps S35 and S40, the motor M is capable of outputting a torque that is based on the torque schedule. As a result, the occurrence of overshoot caused by a torque error ΔT can be suppressed.

Further, according to this embodiment, in a case where the stop initiating signal DIs is input during normal velocity control to cause switching to certain-position stop control, the velocity command to be input to the velocity controller 1 is first switched from the normal-time velocity command E-Vref supplied from the higher-order control device to the C-phase detection velocity command Vc with which the reference position is detectable. After detecting the reference position first, the velocity command is switched from the C-phase detection velocity command Vc to the stop-time velocity command P-Vref generated by the certain-position stop controller 4. That is, when the reference position is detected first, velocity control is switched to position control performed by the certain-position stop controller 4. Further, the time period of certain-position stop control can be shortened by performing position feedback control, velocity feedback control, and torque feedforward control that are based on the same torque schedule during position control.

Further, according to this embodiment, the torque schedule sets changes in torque that is to be actually output by the motor M during a period in which position control is performed in certain-position stop control. Specifically, the value of the torque schedule is set to 0 during the third period tc that is started from the timing at which the reference position is detected first. That is, during the third period tc, a position command, a C-phase detection velocity command Vc, and an input torque command Tref (torque feedforward command Tff=0) are generated so as to keep the motor velocity at the time (the above-described C-phase detection velocity Vc). During the fourth period td, which is from the start timing of the fourth period td to the end timing of certain-position stop control when the motor M stops at the target stop position Pos1, setting is performed so that the value of the torque schedule corresponds to the maximum counter torque PosTref, that is, the maximum torque that can be output by the motor M in the direction opposite to the rotation direction at the time. That is, during the fourth period td, a position command, a stop-time velocity command P-Vref, and an input torque command Tref (torque feedforward command Tff has been added) are generated so that the motor M can be abruptly stopped in the shortest time.

Here, in a case where the maximum counter torque PosTref for abruptly stopping the motor M in the fourth period td is regarded as a reference, the time length necessary for the fourth period td can be calculated on the basis of the C-phase detection velocity Vc, the moment of inertia J of the control target 18 including the rotor of the motor M, and the maximum counter torque PosTref. The moment of inertia J is identified by the moment-of-inertia identification unit 3. The time length of the third period tc is a time length within which the control target 18 moves, at a constant velocity of the C-phase detection velocity Vc, the distance calculated by subtracting a distance that the control target 18 moves in the fourth period td from the movement distance from the reference position to the target stop position Pos1. Thus, the time length necessary for the third period tc can be calculated on the basis of the target stop position Pos1 (with respect to the reference position), the C-phase detection velocity Vc, and the time length of the fourth period td. As a result of setting the process in which the torque schedule is changed, the time period of certain-position stop control can be shortened.

Further, according to this embodiment, in a case where the input torque command Tref to which the torque feedforward command Tff based on the torque schedule has been added is input to the motor M during certain-position stop control, if the motor M actually outputs a torque corresponding to the input torque command Tref, balance is achieved because position feedback control implements position control using a position command that is based on the same torque schedule, and the value of the calculated torque command V-Tref generated by the velocity controller 1 becomes 0. In this case, the motor M is controlled mainly by torque feedforward control that is based on the torque schedule.

In contrast, for example, in a case where the motor M actually outputs, in response to the input torque command Tref input to the motor M, a torque that is different from the torque represented by the input torque command Tref by the torque error ΔT, the velocity controller 1 attempts to generate the calculated torque command V-Tref having such a value that the torque is recovered from 0 by the torque error ΔT, so as to be compliant with the torque schedule using position feedback control. At this time, the existing torque feedforward command Tff is added to the calculated torque command V-Tref generated to have a value different from 0 by the torque error ΔT, and the resulting command is generated as the next torque feedforward command Tff. Accordingly, the motor M actually outputs a torque in which the torque error ΔT has been cancelled. Since position feedback control implements position control in accordance with the torque schedule, and thus the input torque command Tref to which the torque feedforward command Tff has been added is adjusted so that the motor M actually outputs the same torque as the torque represented by the torque schedule. At this time, the torque feedforward command Tff keeps a value deviated from the torque schedule by the torque error ΔT. However, balance in position feedback control is achieved, and thus the value of the calculated torque command V-Tref (before adding the torque feedforward command Tff) generated by the velocity controller 1 returns to 0.

The above-described auto adjustment function can be implemented by switching a state from the state where the torque schedule is generated as the torque feedforward command Tff to the state where the input torque command Tref to which the existing torque feedforward command Tff has been added is generated by as a new torque feedforward command Tff in the procedure of steps S35 and S40. For this purpose, at the start of generation of the torque feedforward command Tff, a model torque schedule is output as the torque feedforward command Tff, and after that, it is necessary to perform switching so that the input torque command Tref is output as the torque feedforward command Tff after the certain period to has elapsed from the start of the fourth period td. After switching, the torque feedforward command Tff is appropriately corrected by reflecting variations of the calculated torque command V-Tref generated by the velocity controller 1. Accordingly, torque feedforward control can be performed in which the motor M is caused to actually output a torque corresponding to the torque represented by the torque schedule.

Further, according to this embodiment, during the third period tc, a torque error ΔT in the motor M does not occur because the values of the torque schedule and the torque feedforward command are 0, and thus it is not necessary to switch the torque feedforward command Tff. During the fourth period td, the torque feedforward command Tff representing the torque of the torque schedule (maximum counter torque PosTref) may be output, and the torque feedforward command Tff may be immediately switched. However, position feedback control is performed on the basis of the output behavior of the motor M, and thus the response speed thereof is lower than that of torque feedforward control. Therefore, in the procedure of steps S35 and S40, switching is performed after the start timing of the fourth period td at which the value of the torque schedule is the maximum counter torque Pos-Tref and at the timing after the velocity controller 1 has generated the calculated torque command V-Tref on the basis of the difference between the position represented by the position command used in position feedback control performed by the certain-position stop controller 4 and the motor position (that is, when the certain period to has elapsed). Accordingly, the torque feedforward command Tff can be functionally corrected.

Further, according to this embodiment, the velocity feedforward command Vff generated from a position command based on the torque schedule is added to a velocity command, and thereby the velocity command can be changed at a quick response speed with respect to change in the torque schedule.

In the above-described embodiment, the position control system of the certain-position stop controller 4 and the velocity control system of the velocity controller 1 are constituted by a feedback loop of a position proportional/velocity integration proportional control system (P-IP control system), but the embodiment is not limited thereto. Alternatively, the position control system and the velocity control system may be constituted by a feedback loop of a position proportional/velocity proportional integration control system (P-PI control system), a position proportional/velocity proportional control system (P-P control system), or the like.

Other than the above-described method, methods according to the above-described embodiment and various modifications may be utilized by appropriately combining them. Although not illustrated, the above-described embodiment and the modifications may be implemented by being changed within the gist of the embodiment and modifications.

It should be understood by those skilled in the art that various modifications, combinations, sub-combinations and alterations may occur depending on design requirements and other factors insofar as they are within the scope of the appended claims or the equivalents thereof.

What is claimed is:
1. A motor control device comprising:
a power converter configured to output a current for driving a motor on the basis of a first torque command;
a velocity controller configured to generate a second torque command on the basis of a difference between a velocity represented by a velocity command for the motor and a motor velocity of the motor; and
a certain-position stop controller configured to perform position control of the motor by, after first detecting a reference position per rotation of a position detector that detects a motor position of the motor during velocity control of the motor, generating a position command for positioning the motor from the reference position detected first to a target stop position at a torque of a torque schedule that is changed in a certain process, generating the velocity command on the basis of a difference between a position represented by the position command and the motor position, and outputting, as the first torque command, a value resulting from adding a torque feedforward command generated on the basis of the torque schedule to the second torque command, wherein the certain-position stop controller includes a torque feedforward command corrector configured to correct the torque feedforward command on the basis of the first torque command.

2. The motor control device according to claim 1, wherein the velocity controller outputs the second torque command as the first torque command during velocity control, the velocity command used in the velocity controller is any one of at least a first velocity command, a second velocity command, and a third velocity command, the first velocity command being a velocity command supplied from a higher-order control device, the second velocity command being a velocity command with which the reference position is detectable, and the third velocity command being a velocity command generated by the certain-position stop controller, after a stop initiating command for initiating stopping at the target stop position has been input in a state where the velocity controller is performing velocity control of the motor in accordance with the first velocity command, the velocity controller performs velocity control of the motor in accordance with the second velocity command instead of the first velocity command, and after the reference position is first detected, the certain-position stop controller performs position control of the motor on the basis of the position command, the third velocity command, and the torque feedforward command.

3. The motor control device according to claim 2, further comprising:

a moment-of-inertia identification unit configured to identify a moment of inertia of a control target including a rotor of the motor, wherein in a process in which the torque schedule is changed, a value of the torque schedule is zero during a first period from a first timing to a second timing, the reference position being first detected at the first timing, the value of the torque schedule corresponds to a maximum counter torque during a second period from the second timing to a third timing at which the motor stops at the target stop position, the certain-position stop controller calculates a length of the second period on the basis of the second velocity command, the moment of inertia, and the maximum counter torque, and the certain-position stop controller calculates a length of the first period on the basis of the target stop position, the second velocity command, and the second period.

4. The motor control device according to claim 3, wherein the torque feedforward command corrector outputs the torque schedule as the torque feedforward command at a start time when generation of the torque feedforward command is started, and performs switching, at a certain timing after the start time, to output the first torque command as the torque feedforward command.

5. The motor control device according to claim 4, wherein the torque feedforward command corrector switches, after the second timing, output of the torque feedforward command at the certain timing, which is a timing after the certain-position stop controller and the velocity controller have generated the second torque command on the basis of a difference between a position represented by the position command and the motor position.

6. The motor control device according to claim 1, wherein the certain-position stop controller generates a velocity feedforward command by performing first-order differentiation on the position command, and the velocity feedforward command generated by the certain-position stop controller is added to at least the velocity command.

7. A motor control method comprising:

performing velocity control of a motor in response to input of a stop initiating command for stopping the motor, so that a motor velocity of the motor becomes a detectable velocity at which a reference position of a position detector that detects a position of the motor is detectable; and performing position control of the motor when the reference position is detected first after a difference between the detectable velocity and the motor velocity has become smaller than a predetermined value, so that the motor is stopped at a preset target stop position in a torque schedule that is changed in a certain process, wherein, in the performing position control, a torque command to be input to the motor is corrected so that a torque output by the motor is compliant with the torque schedule.

8. A motor control device comprising:

power conversion means for outputting a current for driving a motor on the basis of a first torque command;

velocity control means for generating a second torque command on the basis of a difference between a velocity represented by a velocity command for the motor and a motor velocity of the motor; and certain-position stop control means for performing position control of the motor by, after first detecting a reference position per rotation of a position detector that detects a motor position of the motor during velocity control of the motor, generating a position command for positioning the motor from the reference position detected first to a target stop position at a torque of a torque schedule that is changed in a certain process, generating the velocity command on the basis of a difference between a position represented by the position command and the motor position, and outputting, as the first torque command, a value resulting from adding a torque feedforward command generated on the basis of the torque schedule to the second torque command, wherein the certain-position stop control means includes torque feedforward command correction means for correcting the torque feedforward command on the basis of the first torque command.

9. The motor control device according to claim 8, wherein the velocity control means outputs the second torque command as the first torque command during velocity control, the velocity command used in the velocity control means is any one of at least a first velocity command, a second velocity command, and a third velocity command, the first velocity command being a velocity command supplied from a higher-order control device, the second velocity command being a velocity command with which the reference position is detectable, and the third velocity command being a velocity command generated by the certain-position stop control means, after a stop initiating command for initiating stopping at the target stop position has been input in a state where the velocity control means is performing velocity control of the motor in accordance with the first velocity command, the velocity control means performs velocity control of the motor in accordance with the second velocity command instead of the first velocity command, and after the reference position is first detected, the certain-position stop control means performs position control of the motor on the basis of the position command, the third velocity command, and the torque feedforward command.

10. The motor control device according to claim 9, further comprising:
moment-of-inertia identification means for identifying a moment of inertia of a control target including a rotor of the motor, wherein
in a process in which the torque schedule is changed,
a value of the torque schedule is zero during a first period from a first timing to a second timing, the reference position being first detected at the first timing,
the value of the torque schedule corresponds to a maximum counter torque during a second period from the second timing to a third timing at which the motor stops at the target stop position,
the certain-position stop control means calculates a length of the second period on the basis of the second velocity command, the moment of inertia, and the maximum counter torque, and
the certain-position stop control means calculates a length of the first period on the basis of the target stop position, the second velocity command, and the second period.

11. The motor control device according to claim 10, wherein the torque feedforward command correction means outputs the torque schedule as the torque feedforward command at a start time when generation of the torque feedforward command is started, and performs switching, at a certain timing after the start time, to output the first torque command as the torque feedforward command.

12. The motor control device according to claim 11, wherein the torque feedforward command correction means switches, after the second timing, output of the torque feedforward command at the certain timing, which is a timing after the certain-position stop control means and the velocity control means have generated the second torque command on the basis of a difference between a position represented by the position command and the motor position.

13. The motor control device according to claim 8, wherein
the certain-position stop control means generates a velocity feedforward command by performing first-order differentiation on the position command, and
the velocity feedforward command generated by the certain-position stop control means is added to at least the velocity command.

* * * * *